United States Patent

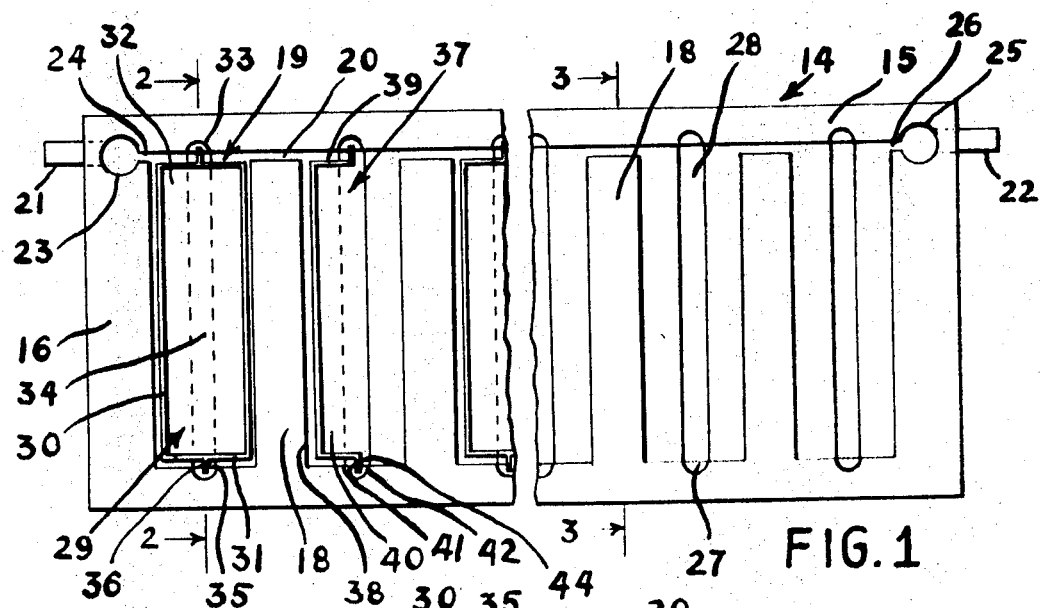
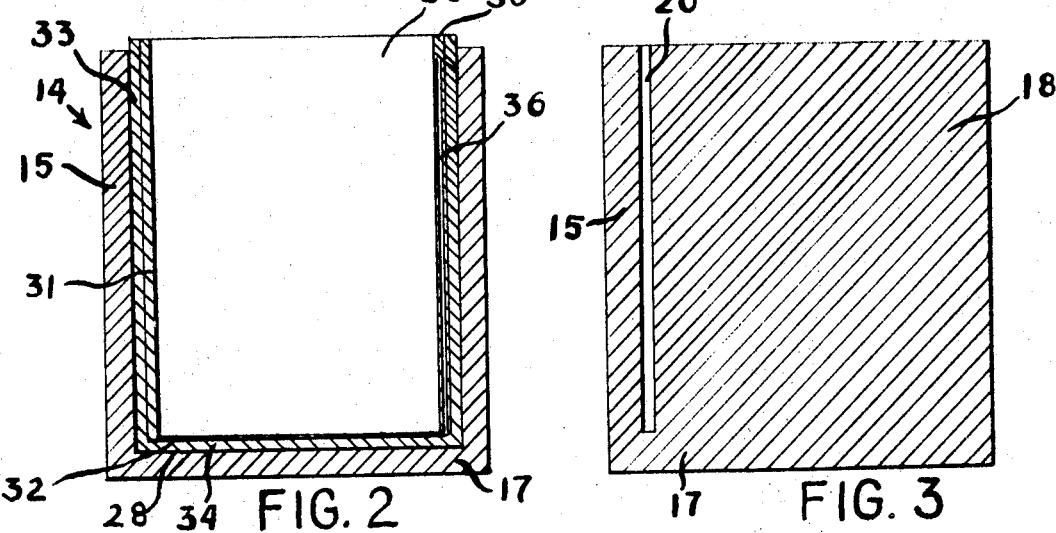
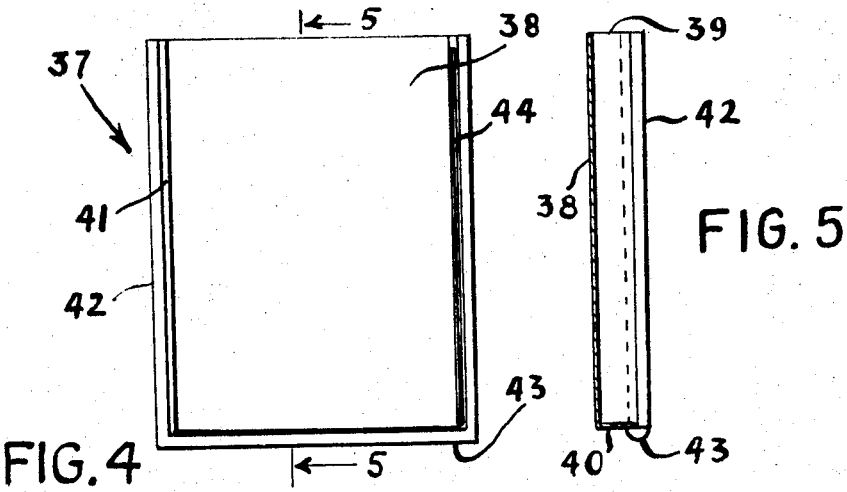

[11] 3,611,904

| [72] | Inventor | Werner W. Buechner<br>4407 Gladding Court, Midland, Mich. 48640 |
|---|---|---|
| [21] | Appl. No. | 843,885 |
| [22] | Filed | June 9, 1969 |
| [45] | Patented | Oct. 12, 1971<br>Continuation-in-part of application Ser. No. 677,241, Oct. 23, 1967, which is a continuation-in-part of application Ser. No. 342,459, , which is a continuation-in-part of application Ser. No. 350,612, , which is a continuation-in-part of application Ser. No. 632,842. |

[54] DEVICE FOR THE WET TREATMENT OF PHOTOGRAPHIC MATERIALS
26 Claims, 11 Drawing Figs.

[52] U.S. Cl........................................................ 95/96, 95/89, 95/94
[51] Int. Cl...................................................... G03d 13/04
[50] Field of Search............................................ 95/98, 94, 96

[56] References Cited
UNITED STATES PATENTS

| 893,103 | 7/1908 | Rubenking, Jr. .............. | 95/98 |
| 2,428,790 | 10/1947 | Dye et al....................... | 95/94 |
| 3,349,688 | 10/1967 | Buechner...................... | 95/96 |
| 3,349,689 | 10/1967 | Buechner...................... | 95/96 |
| 3,470,810 | 10/1969 | Buechner...................... | 95/96 |

Primary Examiner—Samuel S. Matthews
Assistant Examiner—E. M. Bero

ABSTRACT: A photographic wet treatment tank is contained in an outer container for temperature control, with a vertically extending inlet and outlet for temperature controlled water in the walls of the outer container, a barrier between the bottoms of the container and of the tank, forcing the water to flow in a truly horizontal path in a narrow passage and in the form of a narrow layer around the tank.

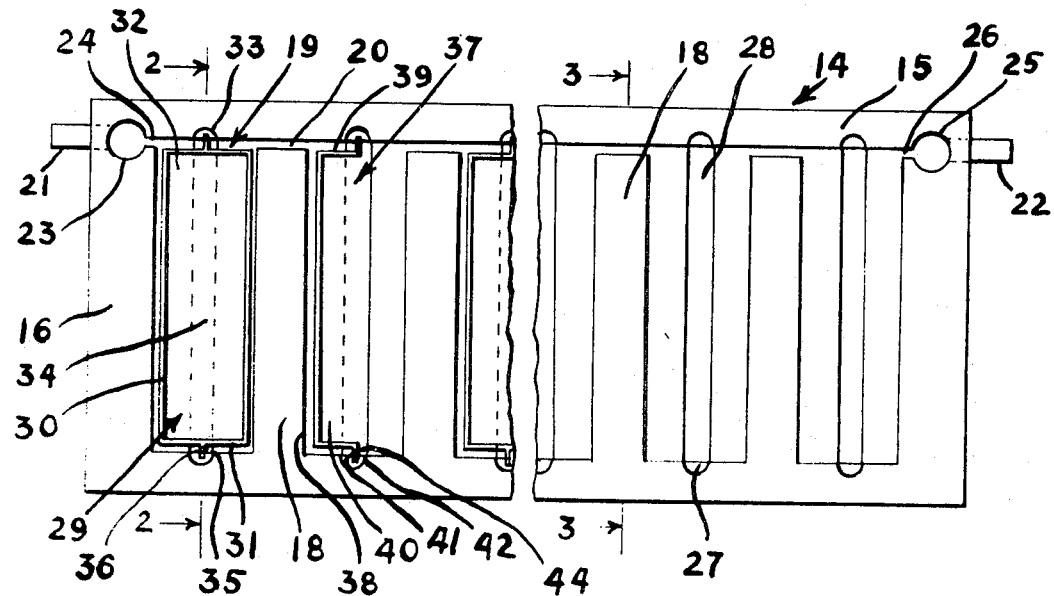

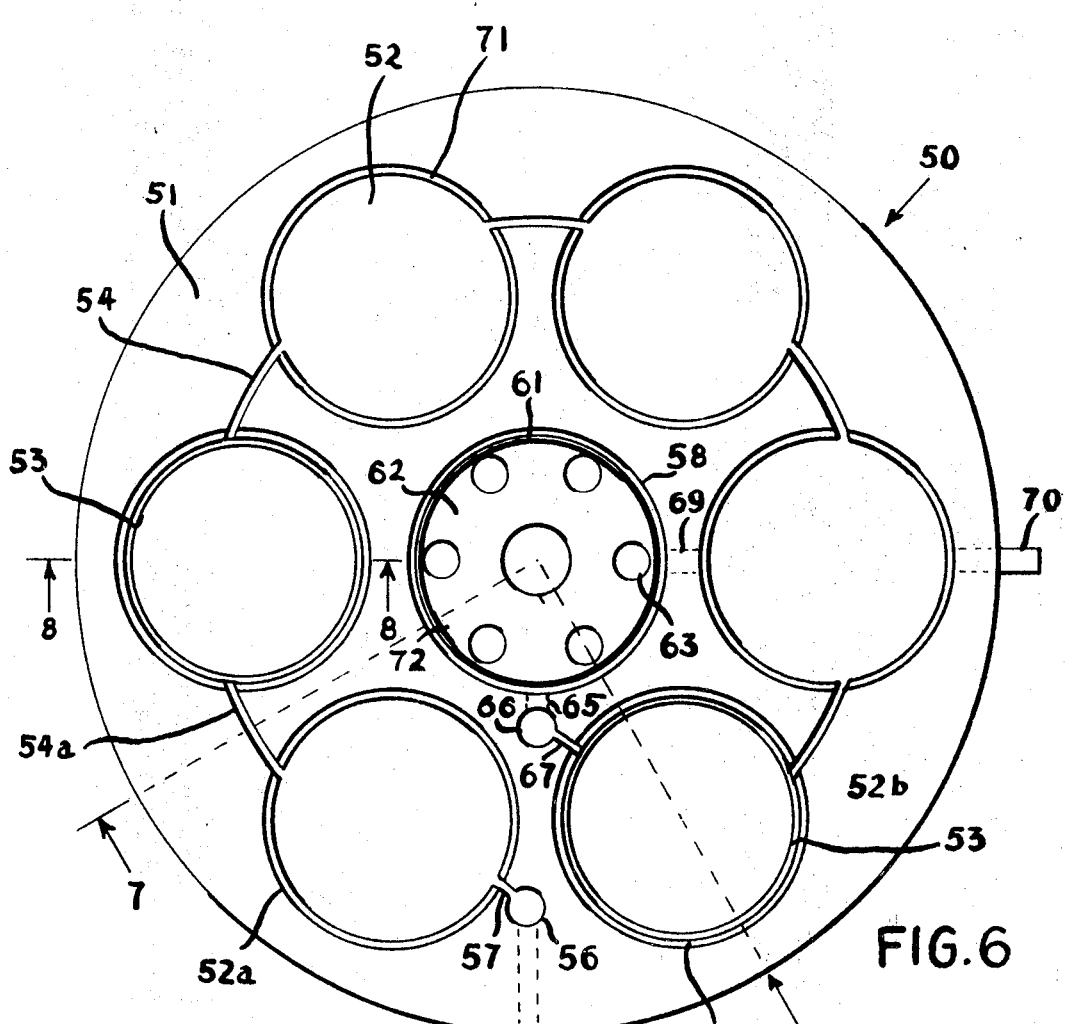
FIG. 6
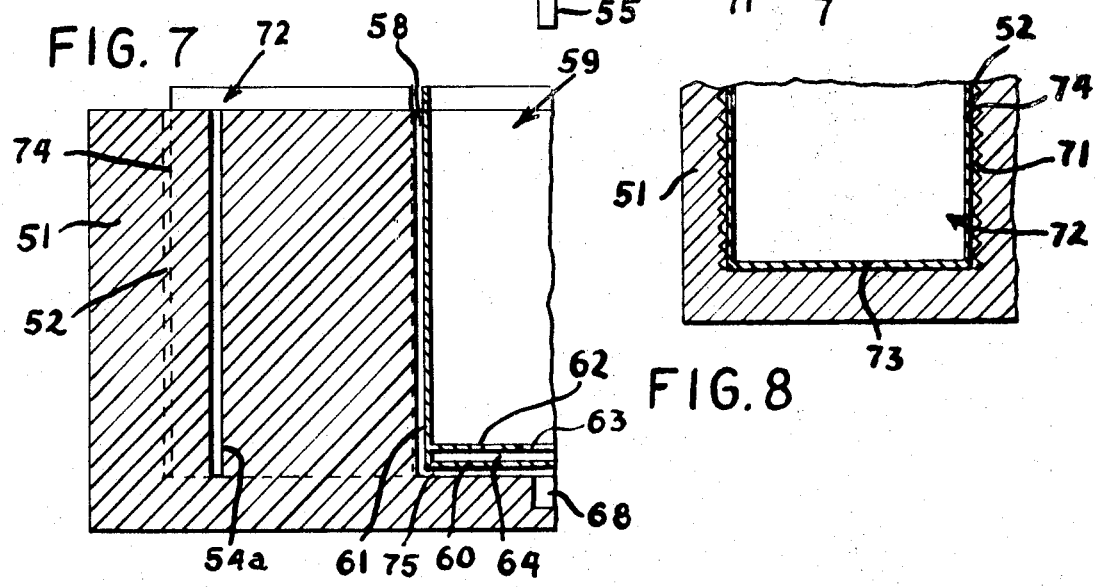
FIG. 7
FIG. 8

DEVICE FOR THE WET TREATMENT OF PHOTOGRAPHIC MATERIALS

This application is a continuation-in-part of my copending application Ser. No. 677,241, filed Oct. 23, 1967 and entitled "Method and Apparatus for the Wet Treatment of Photographic Materials," which in turn is a continuation-in-part of my applications Ser. No.'s 342,459; 350,612 and 632,842.

The present invention relates to a new device for the wet treatment of photographic materials, and more specifically to a device for the exact control of the temperature in photographic treating tanks.

In my applications Ser. No. 342,459, now U.S. Pat. No. 3,411,424; Ser. No. 350,612, now U.S. Pat. No. 3,349,689 and Ser. No. 632,842 is taught apparatus and process for the wet treatment and development of photographic color materials at a predetermined, essentially constant temperature, in which the temperature is maintained in the said treating solutions used for the wet treatment, at the desired or required level by flowing a stream of water having about the desired temperature in such manner that the water flows in form of a thin layer by the major faces of the treating solutions, which may have e.g. the form of a parallelepiped, of a full cylinder or of a cylinder annulus. Preferably, the water flows by the major vertical faces vertically upwards and/or downwards, generally parallel to these major faces. This manner of flowing the temperature conditioning water, in combination with its formation into a widespread thin layer results in very efficient heat exchange and in very excellent temperature control.

In the apparatus used for the practice of the new process, the vessels or tanks containing the treating solutions may be readily and removably inserted in compartments of a compartmented bath or water jacket, in which by the use of suitable washing vessels, likewise set removably in sealing relationship into compartments, any desired color developing process schedule of alternating chemical and washing steps may be duplicated in a given apparatus, yet requiring only a single source of running water for temperature conditioning and for all the washing steps.

It was now found, that the process can be carried out even more efficiently, and the apparatus may be constructed in a still more simple, less complex and less costly manner, if a very thin layer of temperature conditioning medium is flown around the treating solutions in a horizontal sinusoidal path, such that the water or other medium used for the control of the temperature flows in form of a thin vertical layer, essentially uniform over its cross section, passing by the vertical major faces of the vessels or tanks containing the treating solutions, in form of a very thin layer in a generally horizontal flow direction. For the meaning of the terms and expressions used herein and for their definition special reference is made to the above-mentioned copending applications and patents, respectively.

It is therefore an object of the present invention to provide new device and apparatus for the wet treatment of photographic materials, which has built-in provision for very exact temperature control, which can be readily manufactured in simple manner from inexpensive construction materials.

Another object is the provision of a new tank, and composite apparatus, which are especially suited and adapted for the temperature critical development of color materials at a minimum of hot water consumption.

Still another object is the provision of new apparatus, which permits exact temperature control in all steps of a complex color development schedule, at a minimum hot water consumption, exceeding in economy of water consumption the equipment now available for this purpose.

Other objects of the invention will become apparent from the following description of the invention and from the attached drawings.

The objects of the invention are achieved by a device which comprise at least one compartment formed by an outer container, having at least one sidewall and a bottom, said compartment having a water inlet and a water outlet in said sidewalls, both extending vertically over at least the greater part of the height of said sidewalls of the outer container, inserted in said outer container a treating vessel having at least one sidewall and a bottom, a very narrow passageway between the sidewalls of said outer container and of said treating vessel, and means for establishing a barrier and seal between the bottoms of said outer container and of said treating vessel.

The terms treating vessel and tank or treating tank are used herein interchangeably, generally designating a container for the retention of photographic treating media during treatment of photographic material.

The means for establishing the required barrier or seal between the bottom of said outer container and of said treating vessel or tank may be simply a provision for close, essentially water tight contact of the vessel or tank bottom with the bottom of the outer container as shown in the drawings or preferably, these means for establishing seal may be sealing means provided at the tank or vessel bottom and/or at the bottom of the outer container, or they may be a separate entity for insertion between the tank or vessel bottom and the bottom of the outer container, the main criterion being, that they set up a barrier, preventing the passage of the streaming water across the tank or vessel bottom in the general direction of horizontal flow of the water, so as to force essentially all the water fed to the compartment to flow in form of a thin layer completely around the sidewalls of the vessels or tanks or at least from one side to the other of the vessel or tank.

The sealing means, if provided at the bottom of the tank or vessel, may be made to be male or riblike having any desired suitable cross-sectional profile, or they may be female sealing means of suitable profile for cooperation with a male or riblike sealing means provided at the inner bottom of the outer container or compartment, e.g. of the type as described and shown in my copending application Ser. No. 677,131. This type of sealing means preferably extends all across the bottom of the treating vessel or tank and may integrated or connected to the vertical sealing means, at the walls of the tank or vessel e.g. of the type as described hereinafter, if such are present, in a manner similar as shown e.g. in my U.S. Pat. No. 3,373,647, except for the omission of the lower passages shown in this patent. The integrated sealing means are most preferred for equipment, in which the tanks or vessels are removable and exchangeable, or where the bottom area of the tank is relatively large, and where it is desired, that the bottom area of the tank partakes in the heat exchange for temperature control, yet having set up a barrier as taught above preventing the passage of the water in a direction across the bottom of the tank or vessel. The means for sealing or setting up a barrier between the bottoms, comprising direct, essentially water tight contact of the tank or vessel bottom and the bottom of the outer container or compartment, respectively, or a separate cushion, gasket, seal strip or the like for interposition between the bottoms of the two members, are generally preferred in the case, that the tank or vessel is permanently mounted or installed in the outer container. In this latter case, the usual drainage pipes, valves etc. for emptying, filling and cleaning of the tanks may be beneficially provided.

To summarize, the equipment of the present invention is characterized by a barrier or similar means provided beneath the bottom of the tank or vessel in the manner as will be shown by way of example hereinafter. The present invention is applicable to equipment comprising a single compartment and a single tank or vessel contained therein, as well as to equipment comprising a plurality of compartments, which are interconnected by at least one narrow vertical passageway, so as to permit the passage of water or other temperature conditioning liquid from one compartment to the next in succession through said vertical passageways, and inserted in sealing relationship in compartments treating vessels or at least one tank, and/or means for establishing washing locations of horizontally moving layers of water, such that the water or other liquid, passing from one compartment to the next, circumfuses successively said vessels or tanks in form of a thin layer, thereby taking a horizontal sinusoidal flow path around and by the vertical faces of said upright vessels or tanks.

The concept underlying the present invention may be applied to equipment of any desired size, with particular benefits derived in the large size equipment.

In the attached drawings, FIG. 1 is a fragmentary top elevation of an apparatus of the invention comprising inserted in compartments tanks and washing vessels.

FIG. 2 is a vertical section taken along line 2—2 in FIG. 1 and FIG. 3 is a vertical section taken along line 3—3 in FIG. 1.

FIG. 4 is a side elevation and FIG. 5 is a vertical section taken along line 5—5 of FIG. 4 of a washing tank or vessel useful in the apparatus of FIG. 1.

FIG. 6 is a top elevation of an apparatus of the invention comprising cylindrical treating vessels in a circular arrangement around a single central washing station. FIG. 7 is a vertical section taken along line 7—7 in FIG. 6 and FIG. 8 is a vertical section taken along line 8—8 in FIG. 6.

Figure 9:
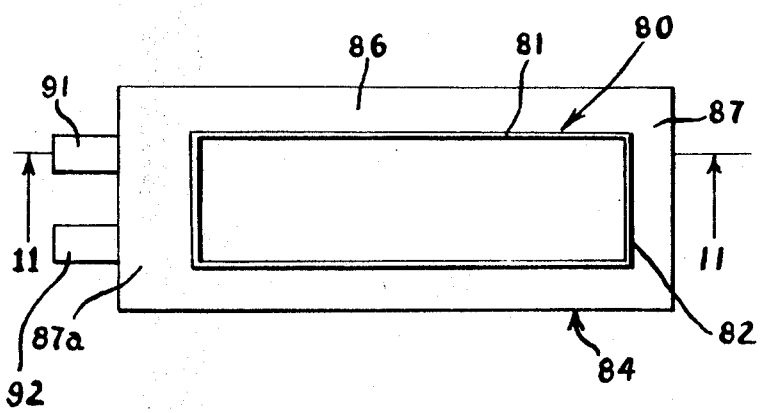
FIG. 9 is a top elevation of a new developing tank of the invention.

The operation of the new method of the invention will be explained and described hereinafter in connection with the description of the new device and apparatus of the invention, though the method is in no way restricted to be practiced in the apparatus described herein.

Referring to FIGS. 1 to 3, the preferred embodiments of the photographic developing or wet treating apparatus of the invention, which is adapted particularly for the development or other treatment of plane photographic sheet materials or of materials arranged, e.g. in a hanger, in form of a plane or essentially plane configuration, comprises a water jacket having essentially sidewalls 15, end walls 16 and bottom 17. The water jacket is subdivided by separating walls 18 into a plurality of compartments 19, which compartments are located side by side and which are connected communicatively with each other by narrow vertical slots 20 for the passage of water or other temperature conditioning liquid from one compartment to the next. Separating walls 18 extend, for highest efficiency and economy, preferably up to the height of the sidewalls 15 and end walls 16, At both end walls 16, at the where slots 20 are provided in the separating walls 18, are provided water inlet tube 21 and water outlet tube 22, respectively. Water inlet tube 21 connects into vertical cylindrical channel 23, which extends up to the top of the water jacket, and which may be used as a well for a thermometer for measuring the temperature of the incoming water. Cylindrical channel 23 is connected by narrow vertical passage 24, extending over the whole height of cylindrical channel 23, to the number one compartment 19 at the left, so as to form a slot over the full height of the compartment for the passage of the incoming water into the number one compartment. In similar manner are provided channel 25 and communicatively therewith narrow vertical passage 26 for the passage of the water out through outlet tube 22.

In each compartment are provided at both end walls (being the respective sections of sidewalls 15 of the water jacket), and in the bottom 17, half-circular cross-sectioned vertical grooves 27 and horizontal groove 28, serving as female sealing means in each of the working compartments. In the number one compartment at the left is shown inserted a tank 29 comprising major sidewalls 30, end walls 31 and bottom 32. To the end walls 31 and the bottom 32 of the tank or vessel 29 are fastened or provided half-circular cross-sectioned vertical male sealing means 33 and horizontal male sealing means 34 of similar cross section, the latter being provided directly at the bottom of the tank or vessel, e.g. by the use of adhesives or the like or by being integral with the bottom of the tank 29. Vertical sealing means 33 are shown to be provided on or at vertical ribs 35, extending along the end walls 31 and serving together with the half-circular cross-sectioned component as the male sealing means. Preferably, the vertical and horizontal sealing means are made as a unit to form a continuous structure of sealing means extending from the top edge of both end walls around the bottom, which when inserted in essentially liquid tight fashion forms, together with the tank 29 a barrier against the flow of the water entering the compartment through slot 24. In rib 35, extending nearly over the whole height of rib 35, is provided a vertical slot 36 for the passage of the flowing water. It is to be noted, that in this embodiment of the apparatus, the slot is provided only in one side of the sealing means of the vessel or tank, viz. in that side which is away from slotlike passages 24 and 20 respectively, when the tank is inserted in the compartment.

In the number two compartment, counted from the left, is shown inserted a washing vessel, which is essentially one half of a treating vessel as just described, cut vertically along its central vertical plane running parallel to the major vertical sidewalls of the treating vessel. The wash vessel 37, which is shown also in FIGS. 4 and 5, comprises a major vertical sidewall 38, end walls 39 and bottom 40. To the end walls 39 are provided extending outwardly like in the treating vessels, sealing ribs 41, onto which are provided half-circular cross section seal strips 42. To the bottom of the wash vessel is fastened half-circular cross section seal strip 43, which is preferably integrated with the seal strips 42 to form a continuous seal around the sides and bottom of the wash vessel of a size, shape and dimensions and position corresponding to that in the treating tank, so as to permit insertion of the vessels with essentially liquid tight seal in the female sealing means provided in the compartments. At one side of the wash vessel is provided in one of the sealing ribs 41 a vertical slot 44 extending over nearly the whole length of rib 41. The wash vessel is likewise placed into the compartments of the water jacket, such that vertical slot 44 is on the side of the water jacket away from vertical slots 20. The sealing ribs, and seal strips 42 in the wash vessel are shaped, dimensioned and positioned to be essentially identical to those of the treating vessels, so that both treating vessels and wash vessels are exchangeable in each compartment of the water jacket, to permit the duplication of any desired multistep photographic treating sequence of chemical treating and washing and rinsing steps.

In the number three compartments, counted from the left, is shown inserted another treating vessel or tank like that shown in the number one compartment. The treating vessels and the wash vessels are inserted in the compartments, one in each compartment, such that tight or essentially liquid tight seal is established between the end walls of the vessel and the juxtaposed end walls of the compartment and between the bottom of the vessel and of the compartment.

Instead of providing male sealing means at the end walls and bottom of the vessels and cooperating female counter sealing means at the end walls and bottom of the compartment, one may also provide female sealing means at the end walls and/or bottom of the vessels and male counter sealing means at the end walls and/or bottom of the compartments, or if desired, male and female sealing means may be provided in the vessel, e.g. as shown in FIG. 6 of my copending application Ser. No. 342,030. It is also possible to provide suitable sealing means on either the vessel or in the compartment, using the end walls and bottom of the vessel or of the compartment, respectively, as the means to provide cooperatively the desired tight seal. It is also possible to interpose between the respective portions of the vessels and of the compartments strips or the like of suitable sealing material, however, this embodiment is for obvious reasons not as desirable and is not preferred.

If the vessel is not provided with male sealing means, e.g. ribs 35 and 41, respectively, the vertical slot 36 or 44, respectively, may be provided in corresponding male sealing means or ribs, contained in the compartments at the side opposite and away from vertical slots 20 in the water jacket. Instead of providing on the just mentioned side of the apparatus sealing means at the end walls of the vessel and/or of the compartment, spacers may be provided at one end wall of the vessel and/or of the compartments, so as to assure the formation of the required vertical slot at this side of the water jacket. Of course, the side of the vessel being next to slots 20 in the water jacket must still be inserted with essentially tight seal so as to bring about the desired horizontal sinusoidal flow path of the temperature conditioning medium, which can be achieved by sealing means at the end walls and bottom as described hereinbefore. Instead of providing the end wall mounted sealing means as exactly vertical sealing means, they are more advantageously slanted inwardly, from top to bottom, so as to form the sides of an inverted trapezoid. In this manner, essentially tight seal is more readily achieved upon insertion of the vessels, i.e. this embodiment of the apparatus is self-sealing. The sealing means may have any other desired form and shape, they may, for instance be shaped and of a kind as shown in my copending applications Ser. No. 342,459, Now U.S. Pat. No. 3,411,424, Ser. No. 350,612, now U.S. Pat. No. 3,349,689, Ser. No. 632,842, Ser. No. 677,132, Ser. No. 677,131 or Ser. No. 677,130. They may have a rectangular, triangular, heart-shaped or other irregular cross section or may have an I-shaped or T-shaped cross section or any other desirable suitable shape.

The vertical slots 20, 36 or 44 and 23 or 25, which are shown in the drawings as continuous slots, may also be a vertical row of perforations or the like. Slots 20 and 23 and 25 may also stop short at a height below the top of the water jacket, being closed at the top and so forth, and many other modifications may be made in this arrangement without bringing these embodiment outside the scope of the present invention. The compartments may have outlet means, which are individually closeable, and which may serve as the means for passing the water out of the water jacket during operation, so that one or more of the treating vessels are bypassed or not circumfused by the streaming water, as has been described e.g. in my application Ser. No. 677,131 or the slots 20 may be provided with closure means, permitting independent closing of any one of the slots, so that the water may be drained out of the water jacket through a drainage hole provided in a suitable position in the separatory walls, so as to achieve the same effect of bypassing one or more treating vessels, or preventing that the water stream passes by a certain vessel during the time of treatment therein, as has been described in my copending application Ser. No. 678,987. These outlet means in the bottom of the compartment or in the separatory walls may also serve to drain out the water contaminated with chemicals in a washing step, so as to prevent that the chemicals are carried through the whole water jacket. Any other means and modifications described in the hereinbefore mentioned applications, the same as any other modifications in shape, dimensioning, and positioning of components may be made so as come readily to mind to one skilled in the art.

The treating and washing vessels may be modified in many ways, e.g. as shown and described, for instance, in my copending applications Ser. No. 342,198 and Ser. No. 342,459. They may have a troughlike expanded portion at the top so as to facilitate the insertion of the carrier with the photographic material or so as to form a reservoir for the retention of excess treating liquid in the case of the treating vessels. The treating vessels may be provided with perforated major sidewalls, with a disposable vessel inserted therein in sealing relationship, so as to serve as a supporting vessel. The vessels may be tapered to form a truncated prism, or they may be provided with separate water inlet and outlet means to serve as a washing vessel for operation with an independent source of running water and many other modifications may be made as set out in said copending applications.

The vessels may also be permanently installed in the water jacket instead of being inserted therein removably as described hereinbefore, though the latter embodiment of the apparatus containing the treating and wash vessels removably is much preferred. Of course, permanently installed treating vessels or tanks are advantageously provided with means for draining the chemical treating solutions from the vessels or tanks.

Regardless of the kind of installation, it is important that sufficiently good or tight seal is established between the parts of the vessels and compartments, as described hereinbefore, and that slots between compartments and slots between the end wall of the vessel and of the compartment are provided, so as to establish the desired sinusoidal or horizontal zigzag pattern of the water passing through the apparatus in accordance with the present invention and as will be explained hereinafter.

For the operation of the apparatus, treating vessels and, if desired, wash vessels, are inserted in the compartments in the order and number as required, (the water jacket may have any desired number of compartments or working compartments up to 15 or more as may be desired), so as to accommodate the process to be carried out. The chemical treating solutions, preferably preadjusted in their temperature to within a few degrees of the desired treating temperature, are filled into the treating vessels or tanks in the order, as they are needed in the process sequence to be carried out. Water inlet 21 is connected to a source of running water, having approximately the temperature at which the treatment is to be carried out, e.g. within 0.2° or 0.5° F. or so of the temperature at which the critical development step is to be carried out. The water may be taken from a thermostatically controlled mixing valve, from a regular mixing valve, or preferably from an apparatus as is described and claimed in my U.S. Pat. No. 3,337,714. The streaming water, entering through inlet 21, passes to the bottom of cylindrical channel 23, wherein it flows in part upwardly and which it leaves, it form of a thin vertical, horizontally flowing layer, through passageway 24, flowing horizontally to the right in the thin passageway formed between end wall 16 and major sidewall 30 of the first treating vessel, changing its direction at the end of the wall and compartment, flowing through horizontal slot 36 in rib 35 of the treating vessel 29, flowing thereafter in the thin, vertical passageway formed between the downstream major sidewall of the vessel and separatory wall 18, flowing still in a primarily horizontal flow direction, through horizontal slot 20 into the next compartment, taking, still in form of a very narrow vertical or upright layer, a similar path between the major sidewall 38 of the wash vessel 37 and the first separating wall 18, changing its direction to flow through horizontal slot 44 of the wash vessel, and spreading out into a wider, slower flowing stream, passing horizontally through the working part of wash vessel 37 and flowing through the next slot 20 into the next compartment, where it circumfuses in the described manner and in a generally horizontal flow direction the next treating vessel and so forth, until the water has passed through all the compartments, flowing from the last compartment through narrow vertical passageway 26 into vertical cylindrical channel 25, where it flows downwardly to leave the apparatus through outlet 22.

By the fact that the water is spread out to a very thin layer, flowing at a relatively rapid speed along and by the large major sidewalls of the vessels or tanks, it is extremely effective in exchanging its heat with the chemical treating solutions contained in the treating vessels, so that the solution in the first vessel assumes the temperature of the water in a surprisingly short time. The apparatus is now ready for beginning a treating sequence, e.g. the development of photographic trilayer color material. While the development in the first step proceeds, which normally takes a rather long time e.g. 7 to 15 minutes or longer, the treating solutions down the line are rapidly adjusted in their temperature within the required limits. When the photographic material has been treated in the first treating solution, it is inserted into wash vessel 37 for the required time, where it is washed in running water. It is then forwarded, step by step, down the line until the multistep treatment is completed.

Sometimes, it may be desireable to run the water countercurrently to the direction of forwardly of the photographic material, especially in those instances, where the treating steps between successive washing steps are relatively short, e.g. only 1 minute or 2 minutes. The countercurrent flow of the wash water assures that fresh clean water is available in each washing step, regardless how closely spaced the washing steps are. In this case, the streaming water enters at outlet 22, if the photographic material is to be forwarded from left to right. If desired, the water may also be run first from left to right (entering through inlet 21) to accelerate the temperature adjustment in the solutions which are used first, and the water is then reversed by entering it through outlet 22, when the first washing step begins. It need not be mentioned that the apparatus of the invention is equally well suited for heating the treating solutions to a desired higher temperature as also for cooling them to a desired lower temperature, e.g. in the case that the room temperature may be higher than the desired treating temperature, (e.g. room temperature 75°, F. treating temperature 68° F.).

To achieve highest efficiency and proper operation of the apparatus of the invention, it is important that the passages between the separatory walls and the major sidewalls of the vessels are kept as narrow as possible. Typical widths, depending on the intended relative flow rates of the water, are one half to 1 inch or more, and more preferably one sixteenth to 1½ inch, with about one eighth to one half inch most preferred for the operation of most amateur size equipment. It is also important, that the slots 20 and also slots 36 and 44 and slots 23 and 25 are accordingly proportioned in their widths. If they are too wide for a given or intended flow rate, the water may not flow evenly over the whole cross section of the apparatus, resulting in less than the highest efficiency. If the slots and passages are dimensioned too narrow, for an intended flow rate, it may not be possible to pass the water through the apparatus at the desired flow rate. It is therefore important to dimension the slots and said passageways with the flow rates of the water in mind, at which the equipment is to be operated. Typical width of the slots 20 and of the other slots are between one sixteenth and 1 inch or more depending on the size of the equipment and particularly on the thickness of the vessels and their capacity for treating solution. For exceptional situations wider or narrower dimensions may be indicated, e.g. if the tanks have an extra great liquid capacity in relation to the size of their major sidewalls. Of course, the apparatus is useful only for vessels or tanks, which are defined as upright vessels, as explained in my copending applications Ser. No. 342,198 and Ser. No. 342,030. The apparatus is most suitable and most efficient if it used with narrow upright vessels, e.g. of the 8×10 or 11×14 or of the 16×20 size, the former having a capacity from 1 qt to 1 gallon and the latter having a capacity of 1 to 2 gallons, as they are most frequently used by photographic amateurs.

The apparatus described hereinbefore, employs a single sinusoidal horizontal flow path for the water, i.e. the water zigzags back and forth between the sidewalls of the water jacket. The apparatus may also be modified by providing slots 20 in the center or thereabouts of the separatory walls 18 instead of at the ends. In this case slots 36 or passages are provided at both end walls of the compartment or in both vertical sealing means of the vessels, so that the water flows in a double sinusoidal horizontal path, splitting up after passing of the central slot in the separately walls into a left and a right branch, each of which circumflows half of the vessel in a horizontal zigzag path, to meet again at the entrance to the next slot 20a in the separatory wall. This type of equipment is exemplified in FIGS. 6 to 8 with an apparatus comprising cylindrical compartments and tanks. But, of course, the principles demonstrated there, are equally applicable to the rectangular type of tank and compartment.

Referring to FIGS. 6 to 8, the cylindrical water jacket 50 comprises body 51, in which are provided in a circle around the periphery cylindrical compartments 52 for the reception of cylindrical treating vessels 53 for the chemical treating solutions. The compartments 52 are connected to each other communicatively by slotlike passageways 54, extending from the bottom of the compartment to the top. Water inlet 55 connects communicatively to vertical cylindrical channel 56, with slotlike passageway 57 connecting into compartment 52a, both channel 56 and passageway 57 extending from a level at the bottom of the compartment to the top of the water jacket.

In the center of the water jacket is provided central compartment 58, in which is shown inserted wash vessel 59. Wash vessel 59 is cylindrical of a size similar to that of the treating vessel and has a double bottom. Closed bottom 60 forms with cylindrical wall 61 the cylindrical vessel proper with a circular opening at the top. Perforated bottom 62 with perforations 63 is placed somewhat above bottom 60 to form a chamber 64 which connects over suitable conduit (not shown) to tubular conduit 65 connecting communicatively into vertical cylindrical channel 66, which also extends over the whole height of the water jacket 50 and which is connected to compartment 52b by slotlike passage 67, which extends likewise over the whole height of compartment 52b. The central compartment 58 comprises in the center depression 68, which connects into tubular outlet conduit 69, extending horizontally outwardly and terminating in water outlet 70.

In the outer working compartments 52 are provided, around the cylindrical outer wall, triangular spacers 71 (best shown in FIG. 8) which extend around the inner periphery of the cylinder wall of the compartment in form of parallel rings arranged from top to bottom of the compartments.

When a treating vessel 72 in inserted in the compartment, the bottom 73 of the vessel is fitting snugly onto the bottom of the compartment. If desired, a cushion of an elastomeric sealing material, forming a horizontal bottom seal, may be placed between the bottom of the vessel or compartment or may be provided on either the bottom of the compartment or the bottom of the vessel. The cylindrical wall 74 of the treating vessel is in contact with the spacers, touching the apexes of the circular spacers 71, and forming between the wall of the vessel triangular cross section circular channels around the inner surface of the cylindrical wall of the compartment.

The spacers may have any other desired cross section and need not be continuous circles. They may also be provided at the outside of the cylindrical wall of the treating vessel instead of at the wall of the compartment. The purpose of the spacers is to assure proper, centered placing of the vessel in the compartment, so that a vertical passageway of even, uniform width is formed all around the vessel for the passage of the water around the major sidewall (the cylindrical wall) in the horizontal sinusoidal path of the invention. Spacers of similar of different design may also be used in the rectangular or parallelepipedal type of the equipment described hereinbefore, for the same benefit.

For the operation of the equipment, treating vessels are inserted in the compartments 52 and filled with the chemical solutions in the order, as they are needed for the carrying out of the multistep process schedule, beginning with compartments 52a. The wash vessel 59 is permanently installed in central compartment 58. Inlet 55 is connected to a source of running water having a temperature close to the desired treating temperatures as described before. The water enters the apparatus through inlet 55, from where it flows into vertical channel 56, passing from there through slotlike passage 57 into compartment 52a. At the place, where the water enters the compartment, it flows against the cylinder wall 74 of the treating vessel contained therein, and divides into two branches flowing uniformly through the circular channels formed between the wall of the treating vessel and the spacers 71, in a horizontal direction around the treating vessel, uniformly and evenly distributed over the whole height of the vessel, until it reaches the slotlike passageway 54a at the downstream side of the compartment, where the two streams of water unite again, flowing through slot 54a whereafter they divide up again to flow around the next vessel in the manner just described, and so forth, until the water flows from the last compartment 52b through slotlike passage 67 into vertical cylindrical channel 66 at the exit side, wherein it flows downwardly to flow through tube 65 into the bottom chamber 64 of the wash vessel. As can be readily seen, the breaking up of the streaming water into two separate horizontal streams, which flow successively in a double sinusoidal path in form of very thin layers around the vessel produces the highest possible heat exchange surface and the most efficient heat exchange, so that the chemical solution in the vessels assumes the temperature of the flowing water in a very short time, whereafter they are maintained at this exact desired temperature for the whole duration of the treatment.

The water entering the bottom chamber 64 of the wash vessel 59 is distributed by plate 62 to flow through perforations 63 evenly over the whole cross section of the wash vessel, overflowing at the top edges into the annular space between the cylinder wall 61 of the wash vessel and the cylinder wall of the compartment (if desired being provided with vertical spacers, not shown). The water collects in space 75 at the bottom center of the compartment from where it flows into depression 68, leaving the apparatus through tubing 69 and outlet 70.

As soon as the chemical solutions in the first or first two or three treating vessels have assumed the correct treating temperature, photographic material, e.g. reels of film, may be inserted successively into the treating vessels and contacted with the respective treating solutions for the required time periods. Whenever a washing step follows a chemical treating step, the material is inserted into the central washing location or station and left therein for the time required for the washing step and thereafter it is reinserted into the next vessel containing the chemical solution for the next chemical treating step, and so forth, until the treatment in the multistep process has proceeded through all the steps in the required order and at the required timing.

The circular apparatus just described, may be modified in may ways and in a manner similar as described hereinbefore. The number of the compartments may be increased or decreased to meet any desired situation. The washing compartment may be provided in the outer circle or separately from the apparatus, or a multiplicity of washing stations may be formed in the outer circle of the compartments as may be desired or needed for alternating washing and chemical treatment as described hereinbefore in connection with the rectangular form of the apparatus. The principles used in the circular apparatus may also be used for the construction of an apparatus, in which the compartments, being cylindrical are arranged in one or two straight rows, etc. with the water inlet at one end and the water outlet at the other end or anywhere inbetween. Apparatus of this basic concept has been described in my copending application Ser. No. 632,842, which apparatus is very similar in basic structure except for the use of a vertical up and down flow pattern.

As has been shown hereinbefore, the apparatus of the present invention is characterized by a plurality of compartments containing treating vessels inserted therein in sealing relationship, such that a narrow passageway is formed around the vessels which forms a continuous path having a horizontal sinusoidal configuration. Water flown through the apparatus successively circumflows the vessels in form of a thin layer extending vertically over essentially the whole height of the vessel or of the major sidewalls of the vessel which it contacts.

If a single sinusoidal path is desired, alternating passageways between compartments are provided at the ends of the compartments (i.e. close to the sidewalls of the equipment or water jacket, respectively). If a double sinusoidal path is desired, horizontal passageways are provided opposite the upstream and opposite the downstream major sidewalls of the vessels in a more or less central location of the separatory walls.

The apparatus of the present invention may be constructed from any suitable material, such as metals, plastics or other suitable materials. Generally, it is preferred to make the apparatus from foamable plastics, such as foamed polyurethane or from foamed polystyrene or the like. These foamed materials not only permit manufacture at low cost but provide also an added insulation value, which is a further contributing factor to the temperature constancy which can be achieved in the apparatus of the invention. The vessels may be made from metals, such as stainless steel or other suitable materials. Generally, it is preferred to make them from plastics, preferably thin polyethylene, polypropylene or polystyrene or the like as has been described in my above copending application.

The inventive concepts and principles underlying the present invention may also be employed in the construction of a jacketed tank similar to that described and illustrated in FIGS. 4 and 5 of my copending application Ser. No. 632,842, but adapted and modified so as to provide a thin-layered path for the water around the inner vessel in accordance with the horizontal single or double sinusoidal flow principle described hereinbefore. The jacketed tank constructed in this manner, may be used in form of batteries of tanks, in which the process and method of the present invention may be carried out. The jacketed tank, illustrated in FIGS. 9 to 11 of the present invention has the added benefit, that the water may be run under pressure through the jacket, so that the passageways may be held even narrower, with a further increase of the temperature controlling efficiency and still better heat exchange based on a given flow rate of the water. When a battery of these jacketed vessels, or of those described in my copending application Ser. No. 632,842, is used, the vessels are connected by tubing with each other such that the single or double horizontal or vertical sinusoidal flow pattern is achieved in a similar manner as described hereinbefore and in my above said copending application.

Figure 10:
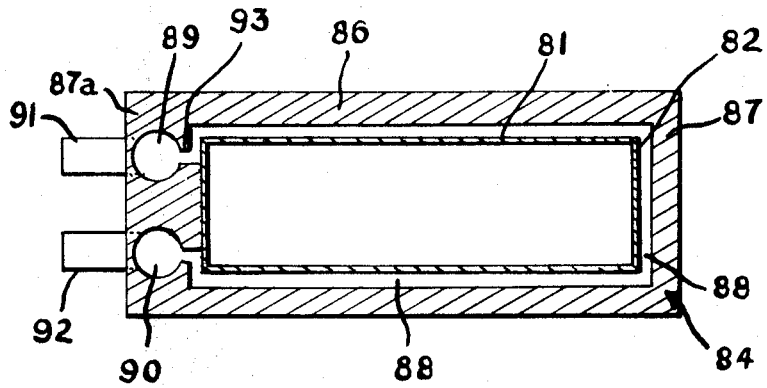
FIG. 10 is a vertical section taken along line 10—10 in FIG. 11
Figure 11:
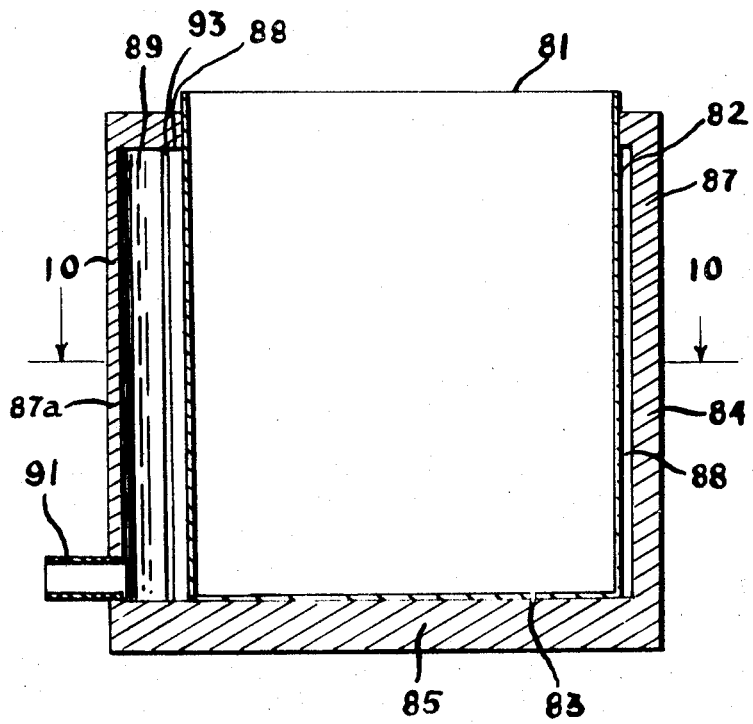
FIG. 11 is a horizontal section taken along line 11—11 in FIG. 9.

Referring to FIGS. 9 to 11 of the present application, the new jacketed photographic treating tank comprises a tank 80, having major sidewalls 81, end walls 82 and bottom 83. The tank 80 is encased in an outer shell 84 of similar shape but of larger dimensions, comprising bottom 85, sidewalls 86 and end walls 87. The bottom 83 of tank 80 is tightly fitted to bottom 85 of outer shell 84, so as to provide essentially liquid tight seal between the two bottom portions. All around the major sidewalls 81 and the right end wall 82 of tank 80 is provided a narrow space or passageway 88 for horizontally flowing a liquid temperature conditioning medium, preferably water, around these walls of the tank. In the left end wall 87a of outer shell 84 are provided vertical cylindrical channel 89 and 90, extending over nearly the whole height of outer shell 84 and connecting at their bottom portion into outlet and inlet tubes 91 and 92, respectively. At the right, channels 89 and 90 are communicatively connected to the respective ends of vertical passageway 88 by narrow vertical slotlike passages, which extend over the full height of the cylindrical channel. In this manner, a complete passage for the horizontal flow of water entered e.g. at inlet tube 91 is formed, so that the water passes in form of a narrow vertical layer in generally horizontal flow direction around the tank 80. It is to be noted, that channels 89 and 90 and passageway 88 are closed at the top, so that a closed system is formed permitting the passage of water under pressure. Thus when chemical treating solution is filled into the tank, and inlet tube 91 is connected to a source of running water of a controlled temperature, being about that to which the chemical solution is to be brought, the water can be flown at a higher flow rate around the tank in form of a very thin layer. In this manner, the heat exchange is very efficient, and the chemical solution assumes in a very short time the temperature of the water passed by its outside in the horizontal flow patter.

In the outer shell 84 and its bottom 85 is made of a heavy layer of insulation material, as shown in the drawings, the flow of the water may be stopped as soon as the chemical solution has achieved the desired temperature. The thick layers of insulation around tank 80 and the water layer standing around the tank prevent that the chemical solution changes its temperature too fast, e.g. by cooling down or heating up as the result of the temperature differential with the surrounding atmosphere. Heat exchange proceeds primarily only through the top opening of the tank, which may also be covered by a lid made from an insulator. In this manner it is possible to maintain the treating solution for a long time at a desired temperature level. It is readily possible, to construct the tank such that the temperature change of the chemical solution is less than about 1/10° F. per 10 minutes per 10° F. temperature differential. Thus the new jacketed tank of the invention is particularly useful for the carrying out of e.g. developing steps etc. of color processes, which must be effected at well controlled temperatures deviating no more than a few tenth degrees from a predetermined mean value.

The same benefit can be achieved also in the jacketed tank, shown in FIGS. 4 and 5 of my copending application Ser. No. 632,842, in which the water is flown in a thin vertically down and upwards around the major sidewalls and the bottom of the tank, when the tank of that application is likewise provided with the heavy layer of insulation of an outer shell similarly as shown herein.

The jacketed tank of the present invention may be modified in many ways. The water inlet and outlet means may be provided at opposite sides, e.g. as shown in FIG. 1 or in FIG. 6. The tank may be cylindrical or annular. There may be provided supporting members such as the spacers described hereinbefore within the narrow passage way between the outer shell and the inner tank, so as to assure equal spacing of these members at all places. Many more modifications may be made by adapting the teaching given herein in conjunction with the developing apparatus. For, instance, instead of integrating or unifying the tank 80 and the outer shell as shown, the outer shell may be designed as a single compartment, similarly as the single compartment disclosed for the vertical flow pattern in my copending application Ser. No. 332,029. In this case the single compartment bath may contain suitable counter sealing means and the tank may be provided with suitable sealing means, slotlike vertical passage means etc. as described hereinbefore, so as to permit removable insertion of the tank into the compartment with seal as described hereinbefore, for establishing the horizontal flow pattern. Of course, in this case the compartment is open toward the top.

I claim:

1. A device for the wet treatment of photographic material, which device comprises at least one compartment formed by an outer container having at least one sidewall and a bottom, said compartment having a water inlet and a water outlet in said sidewalls, both extending vertically over at least the greater part of the height of said sidewall of the outer container, inserted in said outer container a treating tank, having at least one sidewall and a bottom, a narrow passageway between the sidewalls of said outer container and of said tank, and means for establishing a barrier and seal between the bottom of said outer container and of said tank.

2. The device of claim 1, in which said water inlet and water outlet are slotlike openings extending over essentially the full height of said sidewalls of said outer container and being contained in close vicinity, and being communicatively connected to a narrow vertical passageway extending all around the sidewalls of the tank.

4. The device of claim 1, in which said passageway is closed at the top all around, so as to permit passage of water under pressure in a horizontal flow path around the sidewalls of said treating tank.

4. The device of claim 1, in which the compartment and the treating tank contained therein have a rectangular cross section.

5. The device of claim 1, in which said passageway has a width, in horizontal direction between the said sidewalls, of less than one-half inch.

6. The device of claim 1, which comprises a plurality of compartments, at least one of which comprises a treating tank, wherein said water inlet and water outlet are located in opposite positions in the sidewalls of said outer containers, the outlet of one compartment being thereby the inlet of the next compartment.

7. The device of claim 6, in which at least one member selected from the treating tank and the outer container comprises essentially vertical sealing means at the said sidewalls and at least one member selected from the bottom of the tank and the bottom of the outer container or compartment comprises horizontal sealing means for removable insertion of said treating tank in said compartment with the establishing of seal or barriers, and wherein a vertical passageway is provided for establishing a continuous sinusoidal horizontal flow path of water passing through the device and successively through the compartments.

8. The device of claim 6, in which at least one of the compartments comprises means for establishing a washing location of a layer of horizontally flowing water.

9. The device of claim 1, in which are comprised horizontally extending spacer means between the sidewall of said compartment and of said treating tank, said spacer means defining horizontal channels extending between the sidewall of said compartment and of said treating tank and extending from and opening into the vertical inlet and outlet passages of said compartment.

10. The device of claim 1, in which the effective opening of said water inlet and of said water outlet and the vertical cross section of said passageway around the said treating tank are essentially the same.

11. The device of claim 1, in which the compartment and the treating tank contained therein have an annular cross section.

12. The device of claim 1, in which the compartment and the treating tank contained therein have a circular cross section.

13. The device of claim 9, in which said spacer means have a triangular shape, such that the said horizontal channels likewise have a triangular cross section, with the base of the triangle located toward the sidewall of said treating tank.

14. The device of claim 9, in which said spacer means are integrally contained at the wall of said compartment.

15. The device of claim 9, in which said spacer means are integrally contained at the wall of said treating tank.

16. The device of claim 9, in which said spacer means are inserted as a separate member between the sidewalls of said compartment and of said treating tank.

17. The device of claim 1, wherein said treating tank is removably inserted in said compartment.

18. The device of claim 1, which comprises a single compartment and contained therein a single treating tank.

19. The device of claim 6, in which sealing means are provided between the sidewalls of said compartment and of said treating tank.

20. The device of claim 6, wherein neighboring compartments are separated by divider walls, and there is a passageway in each of said divider walls, extending essentially from the top to the bottom of each of said divider walls for passage of water from one compartment to the next.

21. The device of claim 20, in which said passageway is comprised at one end of said divider wall.

22. The device of claim 21, in which said passageways are all contained at the same end of said divider means, so as to be vicinal to the same sidewall of the water jacket, wherein the compartments and divider walls are contained.

23. The device of claim 20, wherein said passageways are contained at about the center portion of said divider walls.

24. The device of claim 1, wherein cooperating male and female sealing means are provided at the sidewalls of said treating tank and of said compartment, and wherein a vertical, narrow passageway is provided in at least one of the male sealing means for establishing a horizontal sinusoidal flow path of water passing through the device.

25. The device of claim 24, wherein said sealing means are slightly slanted, flaring toward the top of the compartment for ready insertion of the tank into the compartment with instant tight seal.

26. The device of claim 1, wherein cooperating sealing means are provided at the bottom of the compartment and of the said treating tank.